United States Patent
Eom et al.

(10) Patent No.: US 9,590,509 B2
(45) Date of Patent: *Mar. 7, 2017

(54) POWER SUPPLY DEVICE

(71) Applicant: FAIRCHILD KOREA SEMICONDUCTOR LTD., Bucheon (KR)

(72) Inventors: Hyun-Chul Eom, Seoul (KR); Young-Jong Kim, Bucheon-si (KR); In-Ki Park, Anyang-si (KR)

(73) Assignee: Fairchild Korea Semiconductor LTD (KR)

(*) Notice: Subject to any disclaimer, the term of this patent is extended or adjusted under 35 U.S.C. 154(b) by 676 days.

This patent is subject to a terminal disclaimer.

(21) Appl. No.: 13/920,448

(22) Filed: Jun. 18, 2013

(65) Prior Publication Data

US 2014/0009973 A1    Jan. 9, 2014

Related U.S. Application Data

(60) Provisional application No. 61/662,502, filed on Jun. 21, 2012.

(30) Foreign Application Priority Data

May 29, 2013  (KR) .................. 10-2013-0061247

(51) Int. Cl.
H05B 33/08    (2006.01)
H02M 3/335    (2006.01)
H02M 1/42    (2007.01)

(52) U.S. Cl.
CPC ..... *H02M 3/33507* (2013.01); *H02M 1/4258* (2013.01); *Y02B 70/126* (2013.01)

(58) Field of Classification Search
None
See application file for complete search history.

(56) References Cited

U.S. PATENT DOCUMENTS

2010/0213857 A1* 8/2010 Fan ................. H05B 33/0827
                                                              315/186
2011/0193494 A1* 8/2011 Gaknoki ............ H02M 1/4258
                                                              315/297

* cited by examiner

*Primary Examiner* — Dedei K Hammond
(74) *Attorney, Agent, or Firm* — Grossman Tucker Perreault & Pfleger PLLC

(57) ABSTRACT

An exemplary embodiment of the present invention relates to a power supply. A power supply according to an exemplary embodiment of the present invention includes: a filter capacitor coupled to a line to which an input voltage rectified from an AC input passed through a dimmer is supplied; a discharge switch coupled to the filter capacitor through the line; and a main switch receiving the input voltage and controlling power transmission. The power supply performs input voltage control to shape the input voltage with a predetermined pattern and controls a switching operation time of the main switch.

18 Claims, 8 Drawing Sheets

POWER SUPPLY DEVICE

CROSS-REFERENCE TO RELATED APPLICATION

This application claims priority to and the benefit of U.S. Patent Application No. 61/662,502 filed in the USPTO on Jun. 21, 2012, and priority to and the benefit of Korean Patent Application No. 10-2013-0061247, filed with the Korean Intellectual Property Office on May 29, 2013, the entire contents of which are incorporated herein by reference.

BACKGROUND OF THE INVENTION (a) Field of the Invention

The present invention relates to a power supply.

(b) Description of the Related Art

A triac dimmer passes each cycle of a sine wave of an AC input by a dimming angle. The input voltage is cut off by the dimmer, and a period during which the input voltage is generated.

A power supply including a dimmer includes a main switch that controls power supply. A conventional power supply switches the main switch even in the period during which no input voltage is generated.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment of the present invention has been made in an effort to provide a power supply that can perform input voltage control and control a switching operation of a main switch.

In addition, an exemplary embodiment of the present invention provides a power supply that can control a voltage of a capacitor.

A power supply according to an exemplary embodiment of the present invention includes: a filter capacitor coupled to a line to which an input voltage rectified from an AC input passed through a dimmer is supplied; a discharge switch coupled to the filter capacitor through the line; and a main switch receiving the input voltage and controlling power transmission. The power supply performs input voltage control to shape the input voltage with a predetermined pattern and controls a switching operation time of the main switch.

An input voltage control period during which the input voltage control is performed includes a first period during which the input voltage is cut off by a dimmer, and the filter capacitor is discharged by a current flowing to the discharge switch during the first period.

The input voltage control period further includes an overlapping period overlapping a period during which the input voltage is decreased, and the current flowing to the discharge switch is controlled with a predetermined pattern during the overlapping period.

An input voltage control period during which the operation time and the input voltage control are performed is generated in one cycle of the input voltage.

The operation time at least includes a period from a time that the input voltage is generated to a peat generation time of the input voltage. The input voltage control period is generated after a predetermined delay period from a time that the operation time is terminated in one cycle of the input voltage.

The operation time at least includes a period from the peak generation time of the input voltage to a time that the input voltage is cut off. The input voltage control period includes a period during which the input voltage is cut off.

A period during which an input current lower than a holding current that is necessary for maintaining the turn-on state of the dimmer is generated in one cycle of the input voltage.

The power supply further includes an operation time controller enabling a switching operation of the main switch during a predetermined operation time.

The power supply further includes a duty determiner controlling the switching operation of the main switch and a gate driver controlling the switching operation of the main switch according to an output of the duty determiner when the operation time controller outputs an enable output.

The power supply further includes an input voltage controller controlling the degree of conduction of the discharge switch during a predetermined input voltage control period.

During the input voltage control period, the input voltage controller generates a gate voltage supplied to a gate of the discharge switch to shape the input voltage with the predetermined pattern.

A power supply according to another exemplary embodiment of the present invention includes a filter capacitor coupled to a line to which an input voltage rectified from an AC input passed through a dimmer is supplied and a main switch receiving the input voltage and controlling power transmission. The power supply control the degree of conduction of the main switch during a predetermined input voltage control period to shape the input voltage with a predetermined pattern and controls switching of the main switch during a predetermined operation time.

The input voltage control period includes a period during which a current flowing to the main switch is increased for a period during the input voltage is decreased.

The input voltage control period includes a period during which the filter capacitor is discharged by a current flowing to the main switch for a period during which the input voltage is cut off by the dimmer.

The power supply further includes an input current controller sensing an input current flowing to the main switch and controlling the input current during the input voltage control period.

The power supply further includes a duty determiner sensing an input current flowing to the main switch to control a switching operation of the main switch and a gate driver controlling the switching operation of the main switch according to an output of the duty determiner during the operation time and controlling the switching operation according to an output of the input current controller during the input control period.

A power supply according to another exemplary embodiment of the present invention includes: a filter capacitor coupled to a line to which an input voltage is supplied; a discharge switch coupled to the filter capacitor; an input voltage detector sensing the input voltage and generating a switching signal by comparing the sensed input voltage and a predetermined reference voltage; a delay circuit delaying a switching signal that turns on the discharge switch; and a reference voltage generator controlling the reference voltage according to a dimming angle.

The input voltage detector generates an input sense voltage using a source current that clamps a sense voltage corresponding to an auxiliary voltage of an auxiliary coil that is coupled to a first coil with a predetermined turn ratio and generates the switching signal according to a result of comparison between a sampling voltage sampled from the input sense voltage and the reference voltage.

The reference voltage generator counts a period during which the sampling voltage is higher than the reference voltage to sense the dimming angle, and controls the reference voltage according to the count result.

The reference voltage generator converts a count signal, which is the count result, to a first level reference voltage when the count signal is lower than a predetermined reference value and converts a level of the reference voltage according to the count signal when the count signal is higher than the reference value.

The delay circuit includes: a first resistor including a first terminal to which the switching signal is input; a diode including a cathode coupled to the first terminal of the first resistor and an anode coupled to a second terminal of the first resistor; a second resistor including a first terminal coupled to the discharge switch; and a capacitor including a first electrode coupled to the second terminal of the first resistor and a gate electrode the discharge switch and a second electrode coupled to a second terminal of the second resistor.

According to the exemplary embodiments of the present invention, a power supply that can control a switching operation time of a main switch and an input voltage control period can be provided.

According to the exemplary embodiment of the present invention, the power supply can control a voltage of a filter capacitor with a sinewave like a line voltage. Therefore, unnecessary power consumption caused by use of a bleeder in a low output power condition can be prevented, and fluctuation of the voltage of the filter capacitor can be prevented from influencing an operation of a load.

DETAILED DESCRIPTION OF THE EMBODIMENTS

Figure 1:
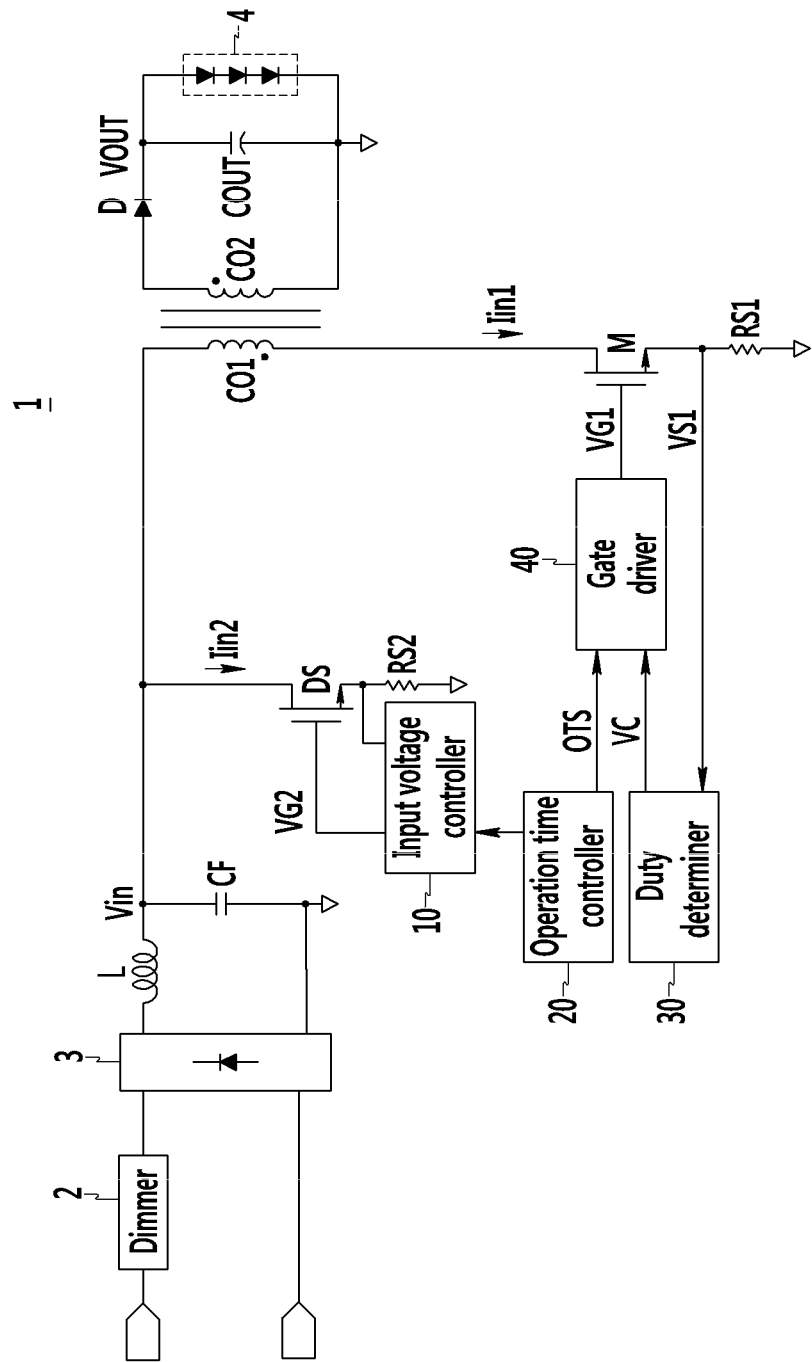
FIG. 1 shows a power supply according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Hereinafter, exemplary embodiments of the present invention will be described with reference to the drawings.

FIG. 1 shows a power supply according to an exemplary embodiment of the present invention.

A power supply 1 supplies power to a load using an AC input. The power supply 1 according to the exemplary embodiment of the present invention includes a switch mode power supply (SMPS). The SMPS supplies power to the load using an input voltage Vin transmitted through a filter capacitor CF. The SMPS includes a first coil CO1, a second coil CO2, a main switch M, a rectification diode D, and an output capacitor COUT.

The power supply 1 further includes an input voltage controller 10, an operation time controller 20, a duty determiner 30, and a gate driver 40. It is illustrated in FIG. 1 that an output terminal of the power supply 1 is coupled to a load 4 that includes a plurality of LED elements that are coupled in series, but the present invention is not limited thereto.

An AC input passed through the dimmer 2 is full-wave rectified by a rectification circuit 3 and thus generated as an input voltage Vin. The AC input passed through the dimmer 2 is determined according to a dimming angle of the dimmer 2. For example, the AC input passing through the dimmer 2 is increased as the dimming angle is large and the AC input passing the dimmer 2 becomes the maximum when the dimming angle is increased to the maximum.

An inductor L and a filter capacitor CF are coupled to lateral ends of the rectification circuit 3, and suppress sudden change of the input voltage Vin. For example, the inductor L prevents a current from being excessively supplied to a line to which the input voltage Vin is supplied, and the filter capacitor CF reduces a variation range of the input voltage Vin due to a voltage drop occurred in the line to which the input voltage Vin is supplied. The filter capacitor CF may also eliminate a noise component of the input voltage Vin. Such performance of the inductor L and the filter capacitor CF is called input voltage filtering.

A first terminal of a first coil CO1 disposed in the primary side is coupled to a filter capacitor C1 and supplied with the input voltage Vin. A second terminal of the first coil CO1 is coupled to a main switch M. A drain electrode of the main switch M is coupled to the second terminal of the first coil CO1, and a first gate voltage VG1 is supplied to a gate electrode of the main switch M to control a switching operation of the main switch M. A source electrode of the main switch M is coupled to a ground through a first resistor RS1.

A second coil CO2 disposed in the secondary side is coupled to an output capacitor COUT through a rectification diode D, and the rectification diode D includes an anode coupled to a first terminal of the second coil CO2 and a cathode coupled to a second terminal of the output capacitor COUT. The output capacitor COUT is charged by a current passed through the rectification diode D and maintains an output voltage VOUT.

A discharge switch DS is coupled to the filter capacitor CF through the line to through which the input voltage Vin is supplied. The discharge switch DS includes a drain electrode coupled to a first terminal of the filter capacitor CF and the input voltage Vin, a gate electrode coupled to an input voltage controller 10, and a source electrode coupled to the ground through a second resistor RS2. A second gate voltage VG2 is input to the gate electrode, and the discharge switch DS is turned on by a high-level second gate voltage VG2.

The input voltage controller 10 performs input voltage control to shape the input voltage with a predetermined pattern using the discharge switch SD. A period during which the input voltage control is performed is referred to as an input voltage control period, and the input voltage controller 10 generates a second gate voltage VG2 that controls the degree of conduction of the discharge switch DS during the input voltage control period. In further detail, the input voltage controller 10 generates a second gate voltage VG2 having a level to shape the input voltage Vin with a predetermined pattern during the input voltage control period. The input voltage control period is a period during which the input voltage Vin is formed with a predetermined pattern by the discharge switch DS.

The input voltage controller 10 may receive a second voltage VS2 generated in the second resistor RS2 to sense a second input current Iin2 flowing to the discharge switch DS. For example, the input voltage controller 10 senses the second input current Iin 2 using the second voltage VS2, and generates a second gate voltage VG2 to allow the second input current Iin2 to flow for forming the input voltage Vin with the predetermined pattern.

The operation time controller 20 controls a switching operation time of the main switch M. The operation time controller 20 enables the switching operation of the main switch M during a predetermined operation time, and disables the switching operation of the main switch M during a period other than the operation time. For example, the operation time controller 20 may transmit an operation time control signal OTS that enables or disables the switching operation to the gate driver 40.

The duty determiner 30 senses the first input current Iin1 flowing to the main switch M and may generate a gate control signal VC that controls the switching operation according to the sensed first input current Iin1. The duty determiner 30 may receive the first voltage VS1 generated in the first resistor RS1 to sense the first input current Iin1.

The gate driver 40 generates a first gate voltage VG1 according to a gate control signal during an operation time.

While the main switch M is being turned on by the first gate voltage VG1, the first input current Iin1 is increased with a slope that depends on the input voltage Vin such that energy is stored in the first coil CO1 in the primary side. When the main switch M is turned off, the diode D is conducted. Then, the energy stored in the first coil CO1 is transmitted to the second coil CO2 in the secondary side, and a current flowing to the second coil CO2 is supplied to the output capacitor COUT or the load 4 through the diode D. As described, the main switch M controls power transmission of the power supply.

Figure 2:
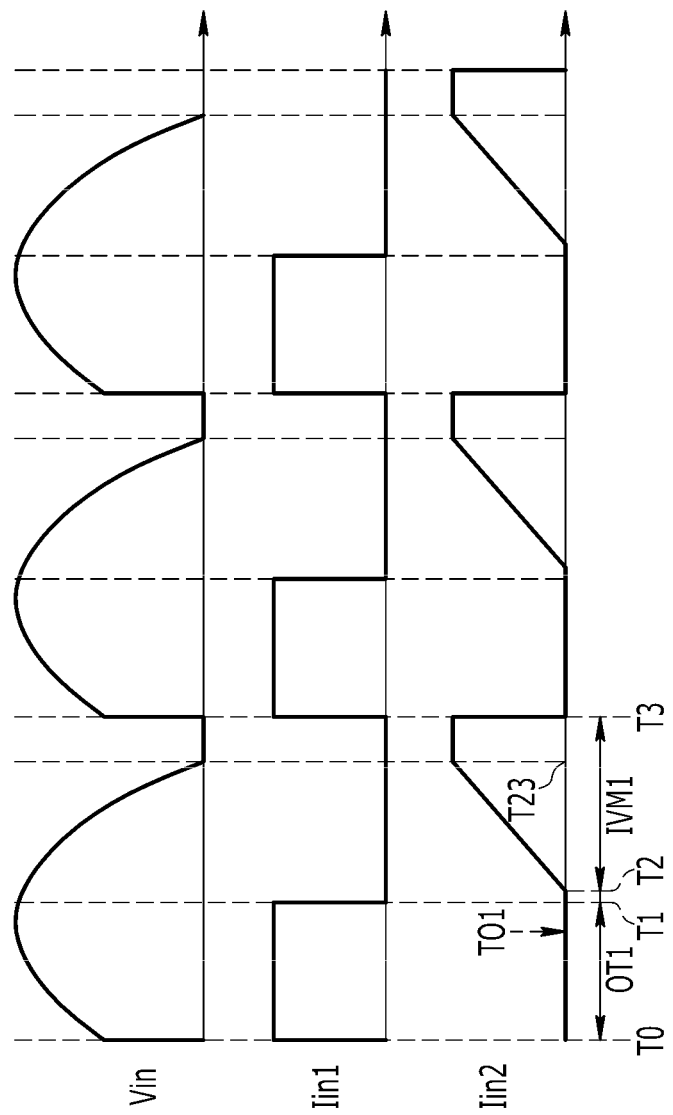
FIG. 2 shows an input voltage, a first input current, and a second input current according to the exemplary embodiment of the present invention.

FIG. 2 shows the input voltage, the first input current, and the second input current according to the exemplary embodiment of the present invention.

In FIG. 2, a waveform of the first input current Iin1 indicates the peak of the first input current Iin1 generated for every switching cycle of the main switch M.

As shown in FIG. 2, an operation time OT1 and an input voltage control period IVM1 exist in every cycle of the input voltage Vin. For example, the operation time OT1 is set to include a period from a time T0 at which the input voltage Vin is generated and a time T1 after the peak of the input voltage Vin. The input voltage control period IVM1 is set to include a time T2 delayed by a predetermined period from the time T1 to a time T3 at which the input voltage Vin is generated again.

In FIG. 2, the operation time OT1 and the input voltage control period IVM1 are not overlapped with each other, but the present invention is not limited thereto. That is, the operation time and the input voltage control period may overlap each other. For example, the input voltage control period may further include a period from a random time (e.g., a time T01 of FIG. 2) between the time T0 to the time T1 to the time T1.

Since the switching operation of the main switch M is enabled during the operation time OT1, the first input current Iin1 is generated with a constant level. After termination of the operation time OT1, the dimmer 2 is turned off if no current flows to the main switch M. In addition, the second input current Iin2 is slowly increased during the input voltage control period IVM1 and maintains the constant level at a time T23. Then, the input voltage Vin is shaped with a pattern shown in FIG. 2.

The input voltage controller 10 may control the second input current Iin2 to be slowly increased using the second voltage VS2. The second input current Iin2 may be slowly increased for a period during which the input voltage is decreased, but the present invention is not limited thereto. The input voltage Vin may be controlled with a predetermined pattern appropriate for shaping the input voltage Vin.

When the first input current Iin1 flowing to the main switch M is blocked and thus the dimmer 2 is turned off, the input voltage Vin should be controlled. Otherwise, an abnormal operation may be occurred so that an input voltage Vin at the turn-off time of the dimmer 2 may be maintained.

In the exemplary embodiment of the present invention, the switching operation of the main switch M is enabled only during the operation time OT1 in a period during which the input voltage Vin is generated, and the input voltage control is performed when the switching operation of the main switch M is disabled.

As previously stated, the operation time control and the input voltage control may be overlapped with each other. However, an input current may be lower than a holding current so as to turn off the dimmer 2. The holding current is the minimum current to main the dimmer 2 in the turn-on state. The input current implies a current flowing through the dimmer 2.

For example, as shown in FIG. 2, when the input voltage control is not formed during a period T1 to T2 from the time T1 at which the operation time is terminated, neither the first input current Iin1 nor the second input current Iin2 may flow. Alternatively, although at least one of the operation control and the input voltage control is performed, the sum of the first input current Iin1 and the second input current Iin2 may be lower than the holding current.

Figure 3:
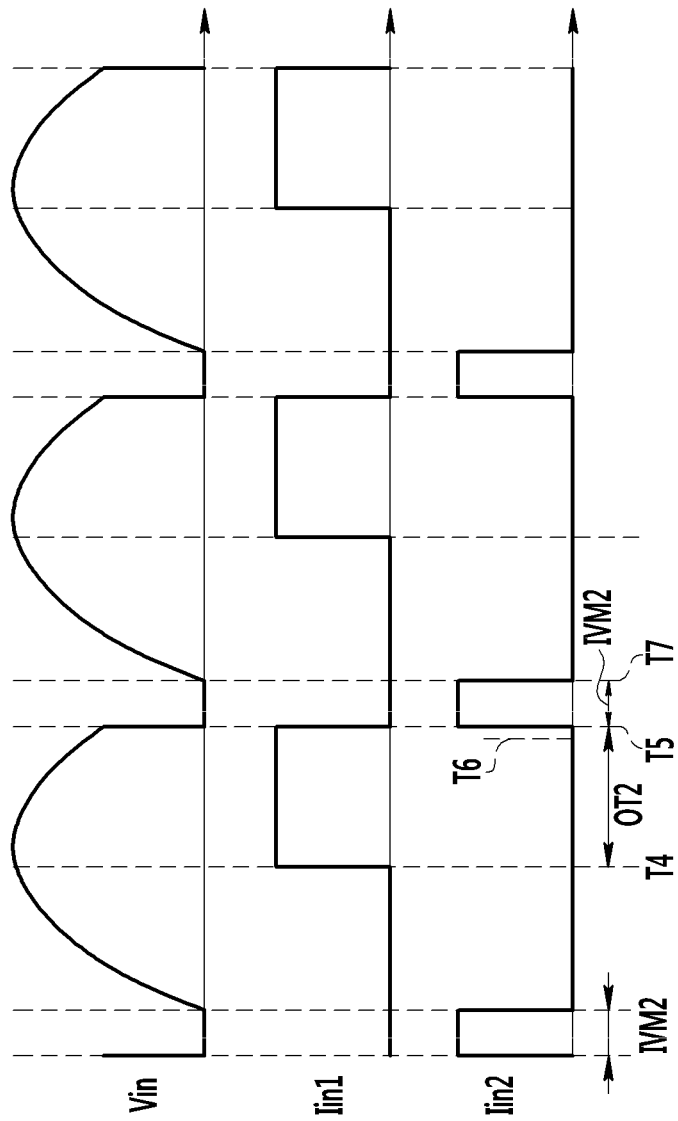
FIG. 3 is a waveform diagram of an input voltage, a first input current, and a second input current that are different from the input voltage, the first input current, and the second input current of FIG. 2 according to the exemplary embodiment of the present invention.

FIG. 3 is a waveform diagram of an input voltage, a first input current, and a second input current that are different from those shown in FIG. 2 according to the exemplary embodiment of the present invention.

As shown in FIG. 3, an operation time OT2 is set to include a period from a time T4 at which the input voltage Vin reaches the peak to a time T5 at which the input voltage Vin is cut off by the dimmer 2, and an input voltage control period IVM2 is set to include a period from the time T5 to a time T7 at which the input voltage Vin is generated again.

However, the present invention is not limited thereto, and the input voltage control period IVM2 may overlap the operation time OT2. For example, the input voltage control may be started from a time T6.

During the input voltage control period IVM2, the input voltage Vin is maintained with zero voltage by the second input current Iin2 flowing to the discharge switch DS. During the operation time OT2, the input current Iin1 maintains a constant level.

A power supply according to another exemplary embodiment of the present invention may not include an additional discharge switch for input voltage control.

Figure 4:
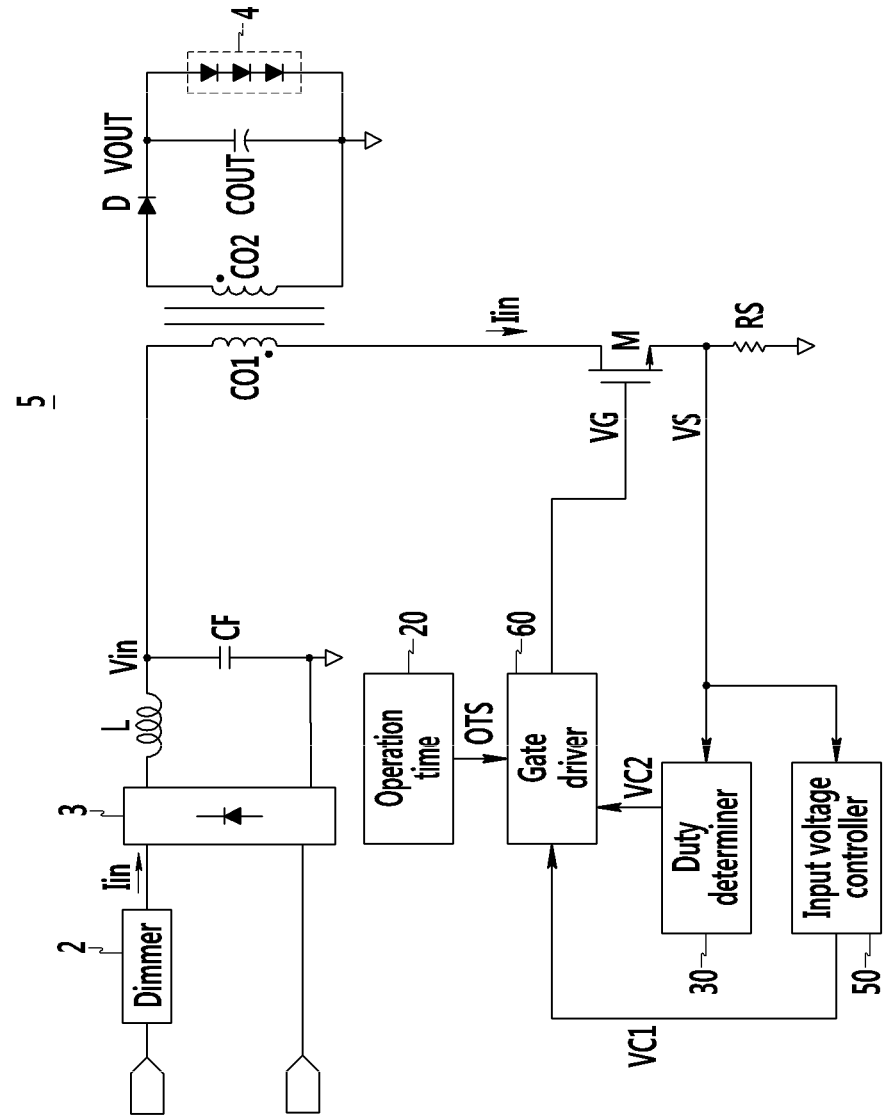
FIG. 4 shows a power supply according to another exemplary embodiment of the present invention.

FIG. 4 shows a power supply according to another exemplary embodiment of the present invention.

The same reference numerals as those of the previous exemplary embodiment will be used for the same elements and a detailed description thereof will not be repeated in the following description.

A power supply 5 includes an input voltage controller 50, an operation time controller 20, a duty determiner 30, and a gate driver 60.

The input voltage controller 50 senses an input current Iin and controls the input current Iin during an input voltage control period. For example, the input voltage controller 50 generates a first gate control signal VC1 to control a switching operation of a main switch M during the input voltage control period using a voltage VS3 generated in the resistor RS by the input current Iin. For example, the input voltage controller 50 generates the first gate control signal VC1 to generate a gate voltage VG having a level for shaping the input voltage Vin with a predetermined pattern during the input voltage control period.

The input voltage controller 10 may receive a voltage VS3 generated in a resistor RS to sense the input current Iin flowing to the main switch M. For example, the input voltage controller 50 senses the input current Iin using the voltage VS3, and generates the first gate control signal VC1 for an input current Iin required to generate the input voltage Vin for flowing an input current Iin required to form the input voltage Vin with the predetermined pattern.

The operation time controller 20 controls a switching operation period of the main switch M. For example, the operation time controller 20 can transmit an operation time control signal OST that enables or disables the switching operation to the gate driver 60.

The duty determiner 30 senses the input current Iin flowing to the main switch M using the voltage VS3, and may generate a second gate control signal VC2 that controls the switching operation according to a sensed input current Iin.

The gate driver 60 generates a gate voltage VG according to the first gate control signal VC1 during the input voltage control period, and generates a gate voltage VG according to the second gate control signal VC2 during an operation time period. The gate driver 60 can distinguish the input voltage control period and the operation time according to the operation time control signal OTS.

Hereinafter, an operation of the power supply according to the other exemplary embodiment of the present invention will be described with reference to FIG. 5.

Figure 5:
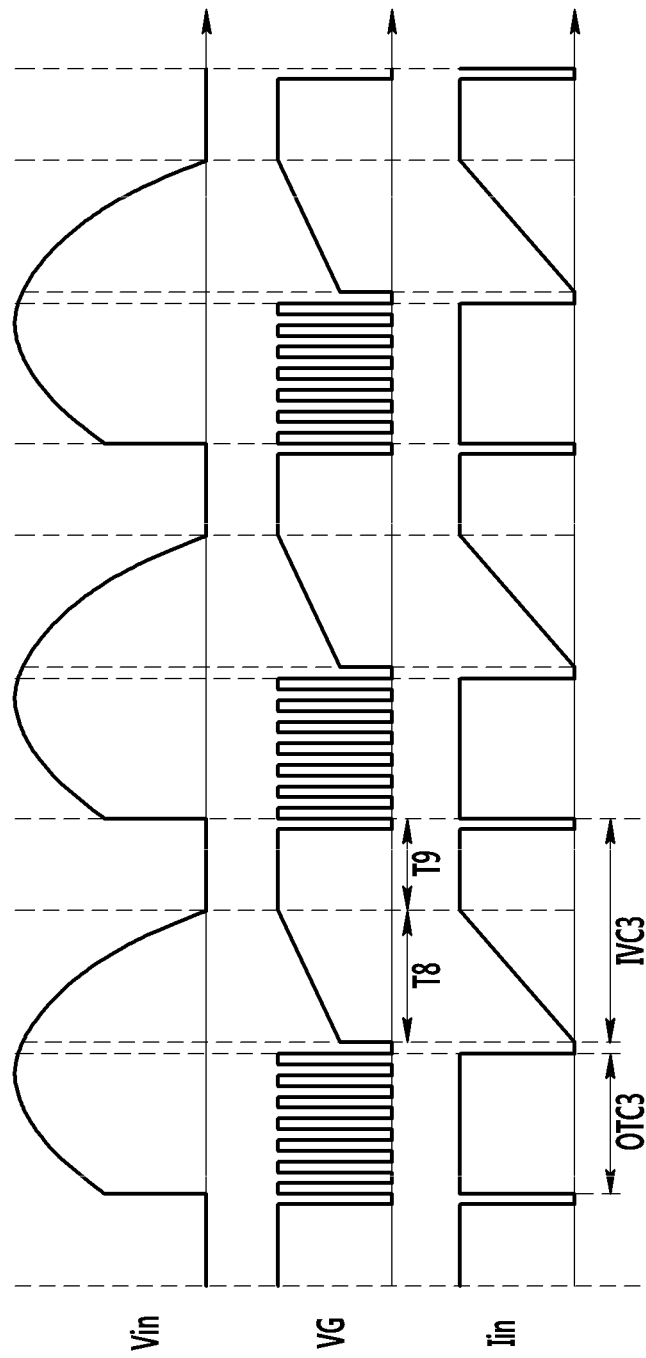
FIG. 5 shows an input voltage, a gate voltage, and an input current according to the other exemplary embodiment of the present invention.

FIG. 5 shows an input voltage, a gate voltage, and an input current according to the other exemplary embodiment of the present invention.

During an operation time OTC3, the gate voltage VG is generated as a pulse signal for controlling the switching operation of the main switch M according to the second gate control signal VC2. The input current Iin maintains a constant level during the operation time OTC3.

When a predetermined delay period is passed after termination of the operation time OTC3, an input voltage control period IVC3 exists. As previously described above, the predetermined delay period is provided for generating an input current that is lower than a holding current in FIG. 5, and the present invention is not limited thereto. That is, although the two period overlap each other, the dimmer 2 may be turned off if the input current Iin is lower than the holding current. The gate voltage VG is generated to control the input current Iin according to the first gate control signal VC1 during the input voltage control period IVC3. For example, as shown in FIG. 5, during a period T8, the gate voltage VG has a gradually increasing waveform to increase the input current Iin. It is illustrated that the gate voltage VG has the gradually increasing waveform in FIG. 5, but the present invention is not limited thereto. The gate voltage VG may have a predetermined pattern to shape the input voltage.

During a period T9, the gate voltage VG maintains a constant level and the input current Iin also maintains a constant level.

As described, the power supply that can control the switching operation time of the main switch and the input voltage control period can be realized through the above-described exemplary embodiments of the present invention.

Hereinafter, another exemplary embodiment of the present invention will be described.

In order to maintain a triac dimmer in a turn-on state, more than a predetermined holding current must flow through the dimmer. When an input current flowing through the dimmer is lower than the holding current, the dimmer is turned off so that a line voltage cannot be coupled with a filter capacitor, thereby causing mis-firing.

For example, a current (hereinafter, a power current) input to a power supply is decreased as output power is decreased, and accordingly the input current is decreased. Since there is a limit in a bleeding current supplied by a bleeder in order to maintain the input current with at least a holding current, it may be difficult to maintain the input current with the at least holding current in a condition that the output power is reduced. Then, possibility in occurrence of the mis-firing due to the turn-off of the dimmer is increased.

After the mis-firing, the line voltage is not viewed from the filter capacitor coupled to an input terminal of the power supply, and therefore a voltage of the filter capacitor is fluctuated. In such a condition, the voltage of the filter capacitor is changed according to a load current coupled to the power supply. For example, when the load current is increased, a decreasing slope of the voltage of the filter capacitor is increased, and when the load current is decreased, the decreasing slope of the voltage of the filter capacitor is decreased.

When the voltage of the filter capacitor is fluctuated, an operation of a load coupled to the power supply is influenced. For example, when an LED string is coupled, flickering may occur.

In order to solve such a problem, shaping of the input voltage is also required in the present exemplary embodiment.

Hereinafter, referring to FIG. 6 to FIG. 8, a driver of a discharge switch and a driving method thereof according to another exemplary embodiment of the present invention will be described. The driver of the discharge switch may be included in the input voltage controller of the previous exemplary embodiment.

Hereinafter, the same reference numerals as those of the previous exemplary embodiment will be used for the same elements and a detailed description thereof will not be repeated in the following description.

Figure 6:
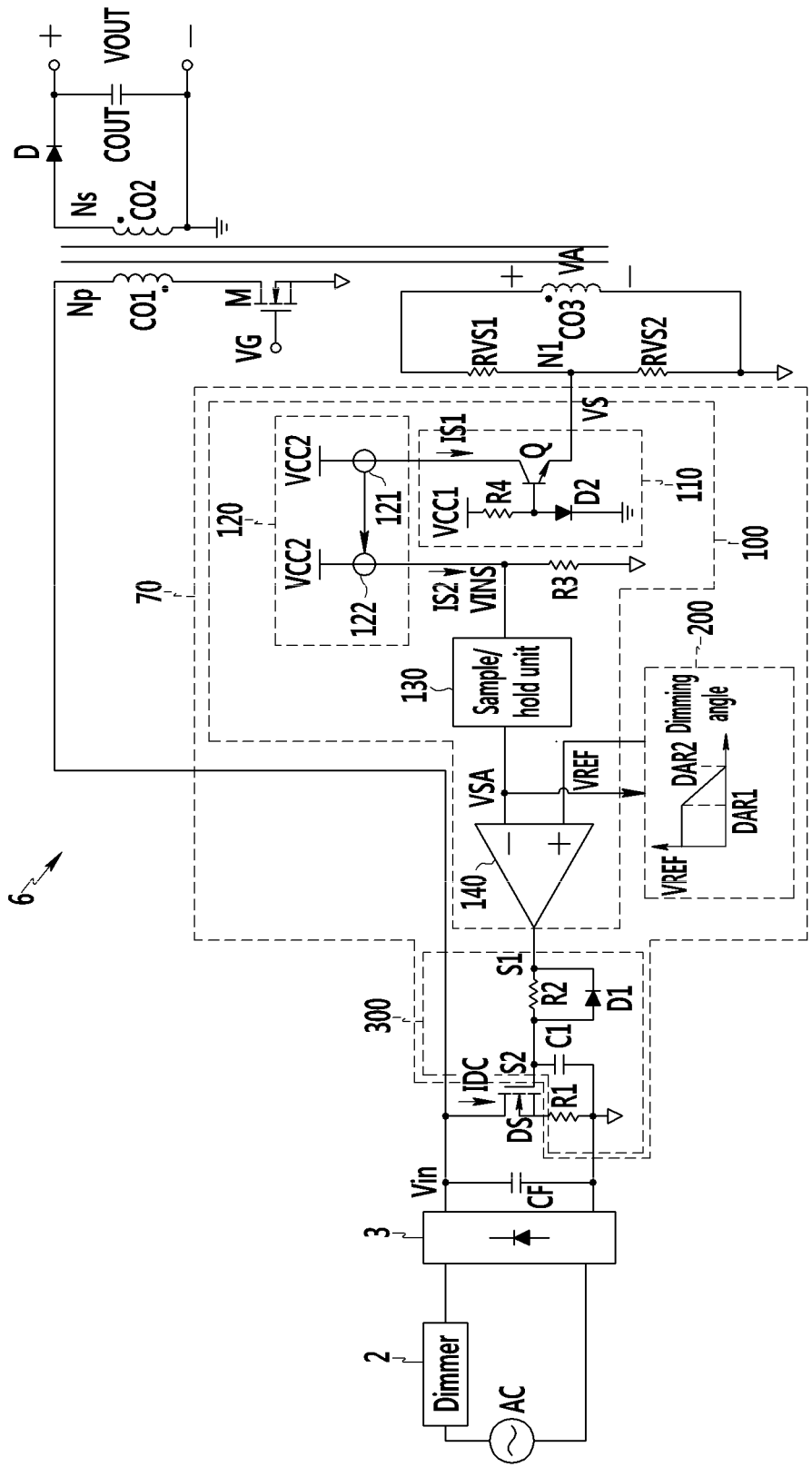
FIG. 6 shows a power supply to which a discharge switch and a driver are applied according to another exemplary embodiment of the present invention.

FIG. 6 shows a power supply to which a discharge switch and a driver according to the other exemplary embodiment of the present invention are applied.

It is illustrated in FIG. 6 that a power supply 6 includes a dimmer 2, but the present invention is not limited thereto. The power supply 6 may not include the dimmer 2.

A filter capacitor CF is coupled to lateral ends of a rectification circuit 3, and suppresses sudden change of an input voltage Vin. For example, when a voltage drop occurs due to a rapid increase of a current in a line to which the input voltage Vin is supplied, the filter capacitor CF decreases a variation range of the input voltage Vin. The filter capacitor CF may eliminate a noise component of the input voltage Vin. Hereinafter, such a function of the filter capacitor CF is referred to as filtering.

A first terminal of a first coil CO1 disposed in the primary side is coupled to the filter capacitor CF, and the input voltage Vin is supplied to the first terminal of the first coil CO1. A second terminal of the first coil CO1 is coupled to a main switch M. A drain electrode of the main switch M is coupled to the second terminal of the first coil CO1 and a gate electrode of the main switch M is supplied with a gate voltage VG such that a switching operation is controlled, and a source electrode of the main switch M is coupled to a ground.

A turn ratio (Na/Np) between turns Na of an auxiliary coil CO3 and turns Np of the first coil CO1 is called wn1. The auxiliary coil CO3 and the first coil CO1 are coupled with the turn ratio wn1.

The second coil CO2 disposed in the secondary side is coupled to an output capacitor COUT through a rectification diode D1, and a turn ratio (Na/Ns) of turns Na of the auxiliary coil CO3 and turns Ns of the second coil CO2 is called wn2. The auxiliary coil CO3 and the second coil CO2 are coupled with the turn ratio wn2.

A voltage of the first node N1 where a first sense resistor RVS1 and a second sense resistor RVS2 that are coupled in series between lateral ends of the auxiliary coil CO3 are coupled is referred to as a sense voltage VS.

A discharge switch DS includes a drain electrode coupled to a first terminal of the filter capacitor CF and the input voltage Vin, a gate electrode coupled to a delay circuit 300, and a source electrode coupled to a ground.

A discharge driver 70 includes an input voltage detector 100, a reference voltage generator 200, and the delay circuit 300. The discharge driver 70 changes a reference voltage Vref according to a sense result of the input voltage Vin, and outputs an output according to a result of comparison between an input sense voltage VINS that senses the input voltage Vin and the reference voltage Vref after delaying a predetermined delay period.

The input voltage detector 100 generates the input sense voltage VINS corresponding to the input voltage using an auxiliary voltage of the auxiliary coil CO3, samples and holds the input sense voltage VINS for each cycle unit of the main switch M, and generates a switching signal S1 of the discharge switch DS according to a result of comparison between the reference voltage and a held voltage.

That is, a current flowing to the discharge switch DS is directly sensed to control a switching operation of the discharge switch DS in the previous exemplary embodiment, but in the present exemplary embodiment, the input voltage Vin is detected and a switching operation of the discharge switch DS is controlled according to the detected input voltage.

The input voltage detector 100 includes a clamping circuit 110, current mirror circuit 120, a resistor R3, a sampling/holding unit 130, and a comparator 140.

The clamping circuit 110 clamps a sense voltage VS generated during a turn-on period of the main switch M to a predetermined voltage (e.g., 0V). In the clamping operation, a source current IS1 is supplied to the auxiliary coil CO3. The clamping circuit 110 includes a resistor R4, a diode D2, and a BJT Q.

In further detail, during the turn-on period of the main switch M, a voltage of the first coil CO1 becomes the input voltage, and a negative voltage (−wn1*Vin) obtained by multiplying the turn ratio wn1 to the input voltage Vin is generated as a voltage VA (hereinafter, referred to as an auxiliary voltage) of the auxiliary coil CO3.

During the turn-on period of the power switch M1, the auxiliary voltage VA is a negative voltage and the source current IS1 flows to the auxiliary coil CO3 through the clamping circuit 200. In this case, the second node N2 coupled to the clamping circuit 200 is equivalent to a cathode potential of the diode D2. Accordingly, the sense voltage VS is clamped to zero voltage.

Among the AC input, a portion (i.e. a portion not included in the dimming angle) cut off by the dimmer 2 has an input voltage Vin of zero voltage. Since the auxiliary voltage VA of the portion is still zero voltage even through the power switch M1 is turned on, a current flowing to the auxiliary coil CO3 from the clamping circuit 100 is not generated.

When the power switch M1 is turned off, a voltage of the second coil CO2 is an output voltage VOUT. The auxiliary voltage VA becomes a positive voltage obtained by multiplying the turn ratio wn2 to the voltage of the second coil CO2. Then, a current flowing to the auxiliary coil CO3 from the second node N2 is not generated. That is, the source current IS1 does not flow.

As described, when the auxiliary voltage VA is zero voltage or a positive voltage, the clamping circuit 200 is not operated and the source current IS1 does not flow. A period during which the source current IS1 is generated according to the exemplary embodiment of the present invention is a period during which the input voltage Vin exists and the power switch M1 is turned on. As describe, the source current IS1 generated during clamping operation of the clamping circuit 200 depends on the auxiliary voltage VA and the auxiliary voltage VA during the turn-on period of the power switch M1 depends on the input voltage Vin, and therefore the source current IS1 depends on the input voltage Vin.

A resistor R4 includes a first terminal to which a voltage VCC1 is input and a second terminal coupled to a base of the BJT Q. An anode of the diode D2 is coupled to the base of the BJT Q1 and a cathode of the diode D2 is coupled to the ground. A collector of the BJT Q is coupled to the current mirror circuit 120, and an emitter of the BJT Q is coupled to the second node N2.

A voltage of the base of the BJT Q1 is maintained to be a threshold voltage (e.g., 0.7V) of the diode D2, and the threshold voltage of the BJT Q1 is set to be the same as the voltage of the diode D2. During the turn-on period of the power switch M1, the source current IS1 flowing to the BJT Q1 is generated, and in this case, the emitter voltage of the BJT Q1 is a voltage obtained by subtracting the threshold voltage from the base voltage of the BJT Q1, and therefore the sense voltage VS is maintained to be zero voltage.

The current mirror circuit 120 generates a mirror current IS2 by mirroring the source current IS1 flowing to the clamping circuit 200. The current mirror circuit 120 includes a first current source 121 and a second current source 122.

The first current source 121 is coupled between the voltage VCC2 and the BJT Q1, and supplies the source current IS1 to the clamping circuit 200 using a voltage source of the voltage VCC2. The second current source 122 is coupled to a voltage VCC, and generates a mirror current IS2 by mirroring the source current IS1 using the voltage VSS2. In the exemplary embodiment of the present invention, the source current IS1 is set to be equivalent to the mirror current IS2.

The mirror current IS2 flows to the sense resistor RS and thus an input sense voltage VINS is generated.

The sampling/holding unit 130 generates a sampling voltage VSA by sampling the input sense voltage VINS for every switching cycle of the main switch M and holds the sampling voltage VSA. For example, the sampling/holding unit 130 generates the sampling voltage VSA during the turn-on period of the main switch M and holds the sampling voltage VSA before the next turn-on period of the main switch M.

The comparator 140 generates an input detection voltage VIND according to a result of comparison between the sampled voltage VSA and a reference voltage VREF. The reference voltage VREF is controlled by the reference voltage generator 200, and the reference voltage VREF is decreased as the dimming angle is increased in an area where the dimming angle is greater than a first dimming angle reference and the reference voltage VREF becomes zero voltage in an area where the dimming angle is greater than a second dimming angle reference.

The comparator 140 includes a non-inverse terminal (+) to which the sampling voltage VSA is input and an inverse terminal (−) to which the reference voltage VREF is input, and generates a high-level switching signal S1 when an input of the non-inverse terminal (+) is higher than an input of the inverse terminal (−) and generates a low-level switching signal S1 when the input of the non-inverse terminal (+) is lower than the input of the inverse terminal (−). Therefore, the high-level switching signal S1 is generated only when the input voltage Vin is decreased and thus the sampling voltage VSA becomes lower than the reference voltage VREF.

The decrease of the input voltage Vin may cause mis-firing. Thus, when the sensed input voltage Vin is lower than a predetermined threshold voltage, the discharge switch DS is turned on to control the input voltage to follow a sinewave like a line voltage. Hereinafter, for convenience of description, the sampling voltage VSA has a level that is the same as a level of the input voltage Vin. In addition, the threshold voltage and the reference voltage VREF have the same level, and a period during which the input voltage Vin is lower than the predetermined threshold voltage is called a mis-fire period. That is, a period during which the sampling voltage VSA is lower than the reference voltage VREF is called the mis-fire period.

When the dimming angle is large or no dimmer is provided, the input current is sufficient so that the possibility that the dimmer 2 is turned off is low. Therefore, the discharge switch DS is turned off in a condition that possibility in occurrence of the mis-firing is low (i.e., when the dimming angle is large or no dimmer is provided).

For example, the reference voltage generator 200 senses a dimming angle using the sampling voltage VSA, maintains the reference voltage VREF with a first level until the dimming angle reaches a first dimming angle reference DAR1, decreases the reference voltage VREF according to the dimming angle when the dimming angle is greater than the first dimming angle reference DAR1, and maintains the reference voltage VREF with zero voltage when the dimming angle is greater than a second dimming angle reference.

Then, when the dimming angle is higher than the second dimming angle reference, the switching signal S1 of the comparator 140 becomes low level. Since a period during which the reference voltage VREF is higher than the sampling voltage VSA is shortened as the reference voltage VREF is decreased, a high-level width of the switching signal S1 is decreased. Accordingly, the turn-on period of the discharge switch DS is decreased.

The delay circuit 300 controls a switching operation of the discharge switch DS. The switching signal S1 turning on the discharge switch DS is varied during a predetermined delay period and then output, and the switching signal S1 turning off the discharge switch DS is output without a delay.

In further detail, since the switching signal S1 turning on the discharge switch DS is high level, the delay circuit 300 generates a gate signal S2 increasing during the delay period from a high-level point of the switching signal S1. If the discharge switch DS is turned on according to the switching signal S1 without delay, the filter capacitor CF is directly discharged so that no input voltage Vin decreasing along the sindewave can be acquired. Furthermore, firing may occur again after mis-firing. Therefore, a current discharging the filter capacitor CF, that is, a discharge current IDC flowing to the discharge switch DS should be slowly increased during the delay period.

When the input voltage Vin exceeds the reference voltage VREF, the discharge switch DS should be immediately turned off. For example, the discharge switch DS should be immediately turned off at a time that the input voltage Vin is generated from zero voltage, that is, a fire time, to control the filter capacitor CF to perform input voltage filtering.

As described, the delay circuit 300 includes two resistors R1 and R2, a capacitor C1, and a diode D1 to control the discharge switch DS according to the switching signal S1.

The switching signal S1 is input to a first terminal of the resistor R2 and a second terminal of the resistor R2 is coupled to a gate electrode of the discharge switch DS. The second terminal of the resistor R2 is coupled with a first terminal of the capacitor C1 and a second terminal of the capacitor C1 is coupled to the ground. Due to an RC delay caused by the resistor R2 and the capacitor C1, a delay period is generated is generated and thus a gate electrode voltage of the discharge switch DS is increased to a high level of the switching signal S1 from a time that the switching signal S1 becomes high level during the delay period.

The resistor R1 is coupled between a source electrode of the discharge switch DS and the ground. The discharge current IDS is also increased for a period during which the gate electrode voltage of the discharge switch DS is increased, and the discharge current IDC is the same current obtained by dividing a source electrode voltage with the resistor R1. Therefore, the resistor R1 determines the degree of increase of the discharge current IDC during the delay period.

The diode D1 is coupled between the gate electrode of the discharge switch DS and the output terminal of the comparator 140, and rapidly discharges the gate electrode voltage of the discharge switch DS at a time that the switching signal S1 becomes low level.

Hereinafter, an operation during the mis-fire period will be described with reference to the waveform diagram of FIG. 7.

Figure 7:
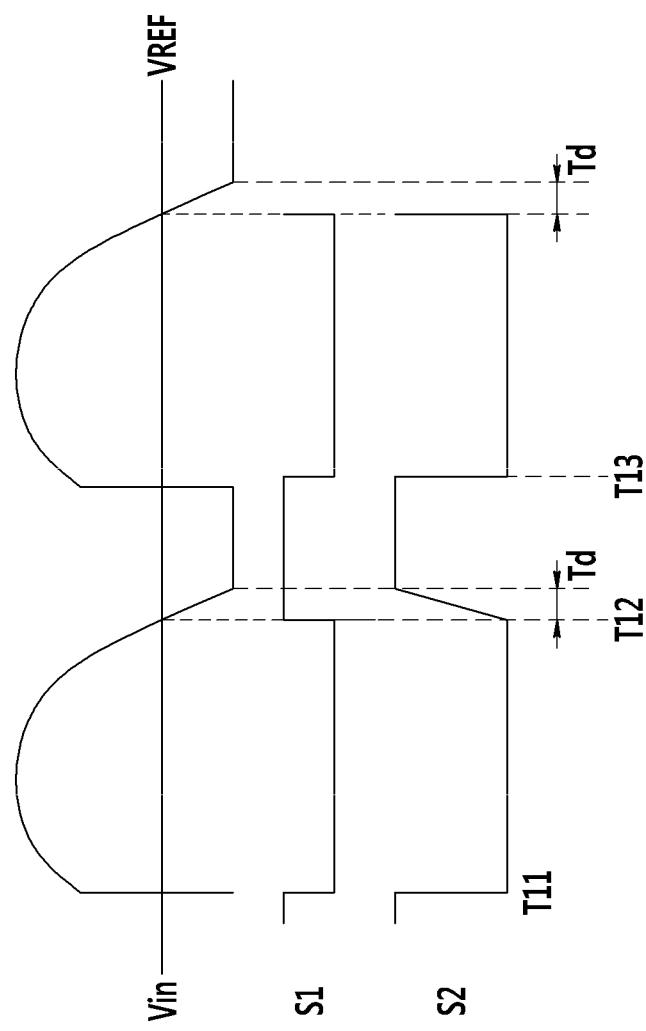
FIG. 7 shows an input voltage, a switching signal, and a gate signal according to the other exemplary embodiment of the present invention.

FIG. 7 shows an input voltage, a switching signal, and a gate signal according to the present exemplary embodiment of the present invention.

As shown in FIG. 7, when a firing occurs at a time T11, the input voltage Vin is higher than the reference voltage VREF and thus the sampling voltage VSA also becomes higher than the reference voltage VREF, and accordingly the switching signal S1 and the gate signal S1 are decreased to low level from the high level.

After a time T12, the input voltage Vin becomes lower than the reference voltage VREF, the switching signal S1 is increased, and the gate signal S2 starts to increase. A period from the time T12 to a time T13 that the next firing occurs is the mis-fire period. The gate signal S2 is slowly increased according to the RC delay during a delay period Td from the time T12.

When firing occurs again at the time T13, the operation after the time T11 is repeated.

Hereinafter, a structure of the reference voltage generator 200 will be described with reference to FIG. 8.

Figure 8:
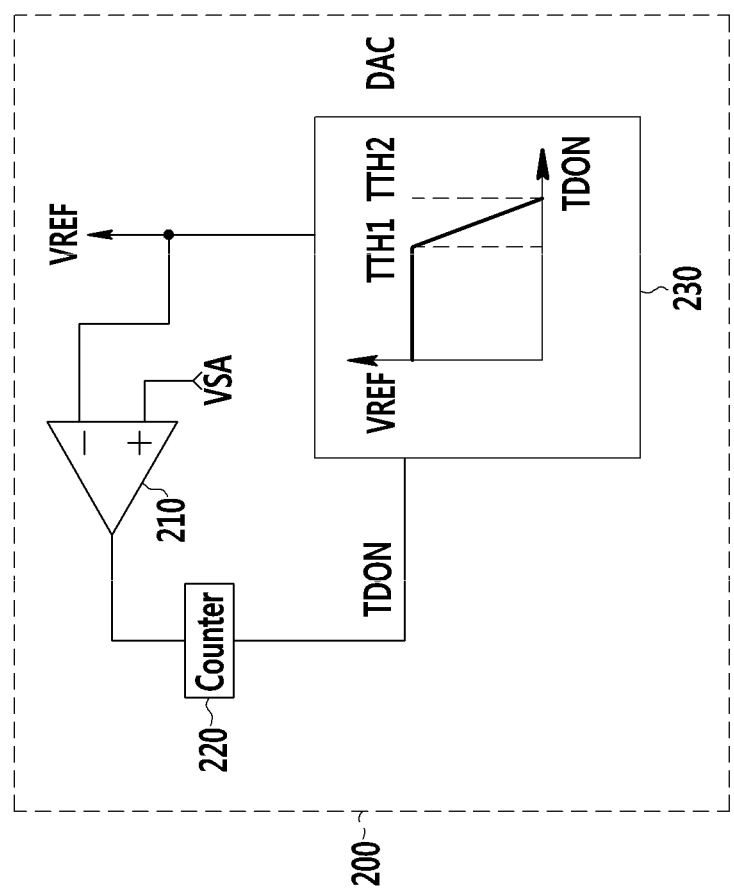
FIG. 8 shows a reference voltage generator according to the other exemplary embodiment of the present invention.

FIG. 8 shows a reference voltage generator according to another exemplary embodiment of the present invention.

A reference voltage generator 200 uses a sampling voltage VSA to sense a dimming angle, and counts a period during which the sampling voltage VSA is higher than a reference voltage VREF, that is, a period during which the input voltage Vin is generated to control the reference voltage VREF according to the count result.

The reference voltage generator 200 includes a comparator 210, a counter 220, and a digital-analog converter (DAC) 230.

The comparator 210 includes a non-inverse terminal (+) to which the sampling voltage VSA is input and an inverse terminal (−) to which the reference voltage VREF is input, and generates a high-level signal when the input of the non-inverse terminal (+) is higher than the input of the inverse terminal (−) and generates a low-level signal when the input of the non-inverse terminal (+) is lower than the input of the inverse terminal (−).

The counter 220 counts a period during which an output of the comparator 210 is high level. In addition, the output of the counter 220 is the count result, that is, a count signal TDON. The count signal TDON is a digital signal indicating a period during which the input voltage Vin is generated.

The DAC 230 converts the reference voltage VREF according to the count signal TDON. When the count signal TDON is lower than a predetermined reference value, the DAC 230 converts the count signal TDON into a first level reference voltage VREF, and when the count signal TDON is higher than the predetermined reference value, the DAC 230 converts the count signal TDON into a reference voltage VREF having a level that depends on the count signal TDON.

As shown in FIG. 8, a predetermined reference value TTH1 corresponds to the first dimming angle reference DAR1, and a predetermined reference value TTH2 corresponds to the second dimming angle reference DAR2.

When the count signal TDON is lower than the reference value TTH1, the DAC 230 outputs the first level reference voltage VREF without regard to the count signal TDON.

When the count signal TDON is higher than the reference value TTH1 and lower than the reference value TTH2, the DAC 230 generates a reference voltage VREF according to the count signal TDON. For example, when the count signal TDON is higher than the reference value TTH1, the DAC 230 generates a reference voltage VREF that is decreased along a predetermined slope as the count signal TDON is increased.

When the count signal TDON is higher than the reference value TTH2, the DAC 230 generates zero voltage without regard to the count signal TDON.

As described, when the input voltage Vin is decreased and thus the mis-firing may occur, the discharge switch DS is turned on to discharge the filter capacitor CF, and the current of the discharge current DS is slowly increased from the turn-on time of the discharge switch DS to the delay period to control the input voltage Vin to be decreased along a sinewave shape like the line value. Further, when the dimming angle is sufficient large or no dimmer is provided, the reference voltage is slowly decreased to zero voltage. Then, unnecessary discharge of the filter capacitor CF can be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS power supply 1, 5, and 6, dimmer 2, rectification circuit 3
discharge switch DS, filter capacitor CF
input voltage controller 10 and 50, duty determiner 30
gate driver 40 and 60, output capacitor COUT
power switch M, first coil CO1, second coil CO2
Auxiliary coil CO3, BJT(Q), rectification diode D
resistor (R1, R2, R4, RS1, RS2, RS3), sense resistor
diode D1 and D2, discharge driver 70
input voltage detector 100, clamping circuit 110
current mirror circuit 120, sampling/holding unit 130
comparator 140 and 210, first current source 121
second current source 122
reference voltage generator 200, counter 220, DAC 230
delay circuit 300

What is claimed is:

1. A power supply comprising:
a filter capacitor coupled to a line to which an input voltage is supplied, the input voltage being rectified from an AC input passed through a dimmer;
a discharge switch coupled to the filter capacitor through the line; and
a main switch configured to receive the input voltage and to control power transmission,
wherein the power supply is configured to perform input voltage control to shape the input voltage with a predetermined pattern and to control a switching operation time of the main switch.

2. The power supply of claim 1, wherein the input voltage control is performed during an input voltage control period, the input voltage control period comprising a first period, wherein the input voltage is cut off by a dimmer and the filter capacitor is discharged by a current flowing to the discharge switch during the first period.

3. The power supply of claim 2, wherein the input voltage control period further comprises an overlapping period overlapping a period during which the input voltage is decreased, wherein the current flowing to the discharge switch is controlled with a predetermined pattern during the overlapping period.

4. The power supply of claim 1, wherein the input voltage control is performed and the operation time of the main switch is controlled during an input voltage control period, wherein the input voltage control period is generated in one cycle of the input voltage.

5. The power supply of claim 4, wherein the operation time comprises at least a period from a time that the input voltage is generated to a peak generation time of the input voltage.

6. The power supply of claim 5, wherein the input voltage control period is generated after a predetermined delay period from a time that the operation time is terminated in one cycle of the input voltage.

7. The power supply of claim 4, wherein the operation time comprises at least a period from a peak generation time of the input voltage to a time that the input voltage is cut off.

8. The power supply of claim 7, wherein the input voltage control period comprises a period during which the input voltage is cut off.

9. The power supply of claim 4, wherein a period, during which an input current lower than a holding current that is necessary for maintaining the turn-on state of the dimmer, is generated in one cycle of the input voltage.

10. The power supply of claim 1, further comprising an operation time controller configured to enable a switching operation of the main switch during a predetermined operation time.

11. The power supply of claim 10, further comprising:
a duty determiner configured to control the switching operation of the main switch; and
a gate driver configured to control the switching operation of the main switch based on an output of the duty determiner when the operation time controller outputs an enable output.

12. The power supply of claim 1, further comprising an input voltage controller configured to control the degree of conduction of the discharge switch during a predetermined input voltage control period.

13. The power supply of claim 12, wherein, during the input voltage control period, the input voltage controller is configured to generate a gate voltage supplied to a gate of the discharge switch to shape the input voltage with the predetermined pattern.

14. A power supply comprising:
a filter capacitor coupled to a line to which an input voltage is supplied, the input voltage being rectified from an AC input passed through a dimmer; and
a main switch configured to receive the input voltage and to control power transmission,
wherein the power supply is configured to control the degree of conduction of the main switch to increase an input current of the power supply during a predetermined input voltage control period to shape the input voltage with a predetermined pattern and to control switching of the main switch during a predetermined operation time.

15. The power supply of claim 14, wherein the input voltage control period comprises a period during which a current flowing to the main switch is increased for a period during which the input voltage is decreased.

16. The power supply of claim 14, wherein the input voltage control period comprises a period during which the filter capacitor is discharged by a current flowing to the main switch for a period during which the input voltage is cut off by the dimmer.

17. The power supply of claim 14, further comprising an input current controller configured to sense an input current flowing to the main switch and to control the input current during the input voltage control period.

18. The power supply of claim 17, further comprising a duty determiner configured to sense an input current flowing to the main switch to control a switching operation of the main switch and a gate driver configured to control the switching operation of the main switch based on an output of the duty determiner during the operation time and to control the switching operation based on an output of the input current controller during the input control period.

* * * * *